United States Patent [19]

Ford

[11] Patent Number: 4,767,539
[45] Date of Patent: Aug. 30, 1988

[54] CLEANING OF HOLLOW FIBER FILTERS UTILIZED IN LUMENAL GAS FLOW

[75] Inventor: Douglas L. Ford, Eastwood, Australia

[73] Assignee: Memtec Limited, New South Wales, Australia

[21] Appl. No.: 56,908

[22] Filed: Jun. 3, 1987

Related U.S. Application Data

[63] Continuation of Ser. No. 755,327, filed as PCT AU84/00192 on Oct. 2, 1984, published as WO85/01449 on Apr. 11, 1985, abandoned.

[30] Foreign Application Priority Data

Sep. 30, 1983 [AU] Australia .................. PG1662

[51] Int. Cl.$^4$ .................. B01D 13/00; B01D 29/38
[52] U.S. Cl. .................. 210/636; 210/794
[58] Field of Search .................. 210/636, 652–654, 210/456, 791, 638, 793, 794; 134/21, 22.11; 55/158; 260/428

[56] References Cited

U.S. PATENT DOCUMENTS

| | | | |
|---|---|---|---|
| 3,838,776 | 10/1974 | Brun et al. | 210/456 X |
| 3,912,624 | 10/1975 | Jennings | 210/636 |
| 3,992,301 | 11/1976 | Shippey et al. | |
| 4,125,462 | 11/1978 | Latty | 210/638 |
| 4,214,020 | 7/1980 | Ward et al. | 55/158 |
| 4,220,535 | 9/1980 | Leonard | 210/456 |
| 4,545,940 | 10/1985 | Muton et al. | 260/428 |

FOREIGN PATENT DOCUMENTS

| | | |
|---|---|---|
| 53-108882 | 9/1978 | Japan. |
| 56-24006 | 3/1981 | Japan. |
| 1535832 | 12/1978 | United Kingdom. |
| 2120952 | 12/1983 | United Kingdom. |
| 955986 | 9/1982 | U.S.S.R. |

OTHER PUBLICATIONS

Sourirajan, "Reverse Osmosis and Synthetic Membranes", Nat. Res. Con. Canada; NRCC No. 15627; 1977; pp. 325–328.
"Membrane Filtration", by Thomas D. Brock, Science Tech., Inc., (1983), pp. 6, 48, 50, 306 and 307.
"Fifteen Years of Ultrafiltration . . . ", by A. Michaels, pp. 1–17, in *Ultrafiltration Membranes and Applications*, Edited by A. R. Cooper, (Am. Chem. Soc. Sym., Washington, Sep. 9–14, 1979, Plenum Press, N.Y., 1980.

*Primary Examiner*—Frank Sever
*Attorney, Agent, or Firm*—Oblon, Fisher, Spivak, McClelland & Maier

[57] ABSTRACT

A method of cleaning a filter having a plurality of elastic, porous hollow fibers with lumens within a shell or housing and in which filtration is carried out by applying a liquid suspension feedstock to the outer surface of the fibers whereby a portion of feedstock passes through the walls of the fiber to be drawn from the fiber lumens as a filtrate or permeate, and a portion of the solids in the feedstock are retained on or in the pores of the fibers, with the non-retained solids being removed from the shell or housing with the remainder of the feedstock, said method entailing introducing a pressurized gas into the fiber lumens which passes through the walls of the fibers to dislodge the retained solids, the gas being applied at a pressure which is sufficient to overcome the effect of the surface tension of the continuous phase of the feedstock within the pores of the membrane.

24 Claims, 1 Drawing Sheet

CLEANING OF HOLLOW FIBER FILTERS UTILIZED IN LUMENAL GAS FLOW

This application is a continuation of application Ser. No. 755,327, filed as PCT AU84/00192 on Oct. 2, 1984, published as WO85/01449 on Apr. 11, 1985, now abandoned.

FIELD OF INVENTION

This invention relates to the cleaning of filters and more particularly to the cleaning of filters made of hollow fibres having a pore size in the range from 5 micron to 0.01 micron.

BACKGROUND ART

Membrane fouling is generally recognised as the outstanding problem in modern ultrafiltration. A full discussion of the problems can be found in "Fifteen Years of Ultrafiltration" by Michaels, A.S. in *Ultrafiltration Membranes and Applications* edited by A. R. Cooper (American Chemical Society Symposium, Washington, 9-14 Sept. 1979, Plenum Press, New York (1980); ISBN 0-306-40548-2) where it is stated:

"the problems of reduced throughput, capacity, increased power consumption, compromised separation capability, and reduced membrane service lifetime associated with macro-, solute- and colloid-fouling of ultrafiltration membranes have stubbornly resisted adequate solution despite ten years of engineering experience in pilot- and full-scale industrial situations."

According to Michaels, back-washing by reverse flow of permeate in hollow-fibre membrane modules, significantly aids unplugging of membrane pores and detachment of adhering deposits. However, there are only two specific examples of permeate back-washing described in this text and these concern filtration of town water and of electro-deposition paints emulsified in water.

As set forth at pages 109 to 127 of the above text, back-washing of hollow fibres with permeate is used where operating transmembrane pressures are only about one atmosphere so that particles are not driven hard into membrane pores during the filtering process. As indicated above, permeate back-washing has been used where the fouling species are in liquid paint emulsion droplets as these species do not wedge into the membrane pores as do solids. As the transmembrane flux is often only five to twenty liters per square meter per hour (L/m² hr), the corresponding fluid velocity is only a few millimeters per hour and there is, therefore, no possibility of a high velocity cleaning action.

Permeate back-washing is, in essence, a recycling process and thus a sacrifice of production rate is only justified when the cleaning effect is significant. Some sticky natural wastes (such as brewing residues, starch, and egg) are not removed to any appreciable extent by permeate back-washing. Permeate back-washing is, by definition, a purely hydraulic flow through totally wetted pores of the ultrafiltration membrane. Hollow, porous fibre ultrafilters are preferred where back-wash cleaning is needed because of the structure of the hollow fibres.

DISCLOSURE OF INVENTION

It is an object of this invention to provide an improved method of back-washing hollow fibre filters which uses gas as the back-wash medium.

The penetration of gas into the pores of a membrane is resisted by the surface tension forces of the contained wall-wetting liquid according to well known theory. Indeed, surface tension is conveniently measured by the breakthrough pressure needed to force a bubble out of a submerged orifice. For common systems (such as oil in hydrophobic pores or water in hydrophilic pores) the breakthrough pressure required ranges from ten kilopascals to a thousand kilopascals. The breakthrough-pressures are much higher than the usual operating pressures of the filter.

Prior art hollow-fibre type ultrafilters are usually fed from the inside of the fibres for many well known reasons. However, according to the present invention, feedstock is applied to the outside of the fibres and gas is introduced into the lumen of the fibre as the back-wash medium. In some cases, the lumen pressure swells a suitably designed fibre so that the pores are enlarged whereby the particles are freed and swept away in the expansion of the back-wash gas.

The products of our co-pending International Patent Application No. PCT/AU84/00179 "Treatment of Porous Membranes" are ideal for gas back-wash since they are highly elastic hydrophobic, relatively coarser porous membranes which have a tenacious hydrophilic coating and interstitial hydrophilic packing. The packing prevents pore collapse when fed under pressure from outside the porous tube. The packing is of different resilience and allows controlled expansion of the (formerly hydrophobic) pores to which it adheres. It is thus possible to design the composite fibre so that the gas release characteristics are ideal for cleaning off different types of blockage in differing configurations of fibre bundles without pressures greater than those needed to sweep away the deposits rapidly.

In some cases, especially where very fine-pored interstitial material is deposited in relatively coarsepored base fibre, it is advantageous to back-wash first with a small amount of permeate already in the membrane lumen and follow with the high pressure gas back-wash. In this way, the small amount of permeate adequately washes out fine blocking material from within the interstices, and the overall cleanin is completed by the higher pressure gas swelling the base pores and erupting around elastic openings. The pores must close again rapidly to reseal the holes and the base material must not crack by work hardening and must remain within its modidied elastic limit.

Polypropylene base is very resistant to flex cracking but is hydrophobic and rather too easy to crush. Its properties may be improved by elastic modification which can be accomplished by the method of our above-mentioned copending International patent application. The two inventions together synergistically improve the performance of microfilters and ultrafilters.

The use of gas as a back-wash medium enables the removal of fouling species by explosive decompression of the gas through the membrane structure for the minor part and at the outer membrane surface for the major part. Thus, the gaseous back-wash step is carried out at a pressure which is sufficient to overcome the effect of the surface tension of the continuous phase of the feedstock within the pores of the membrane.

DESCRIPTION OF PREFERRED EMBODIMENTS

Figure 1:
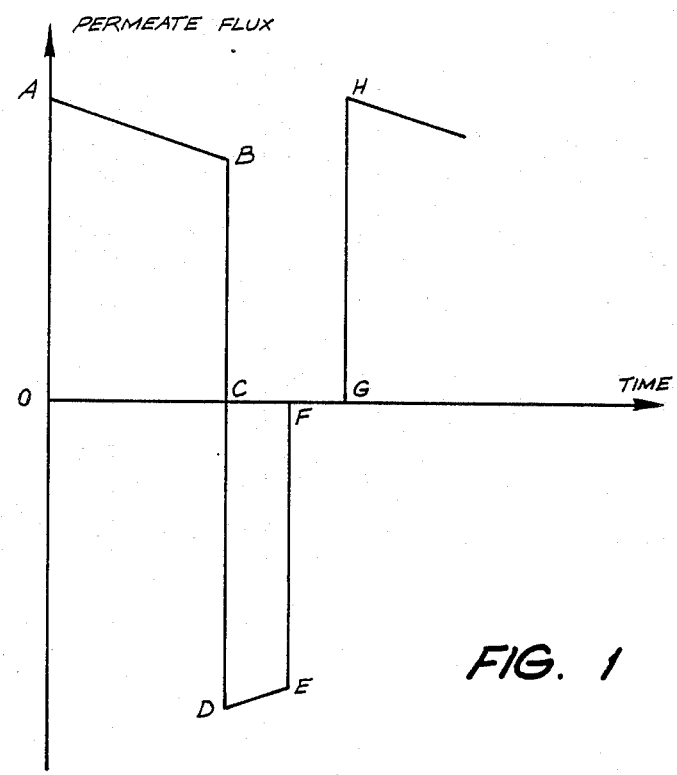
Figure 2:
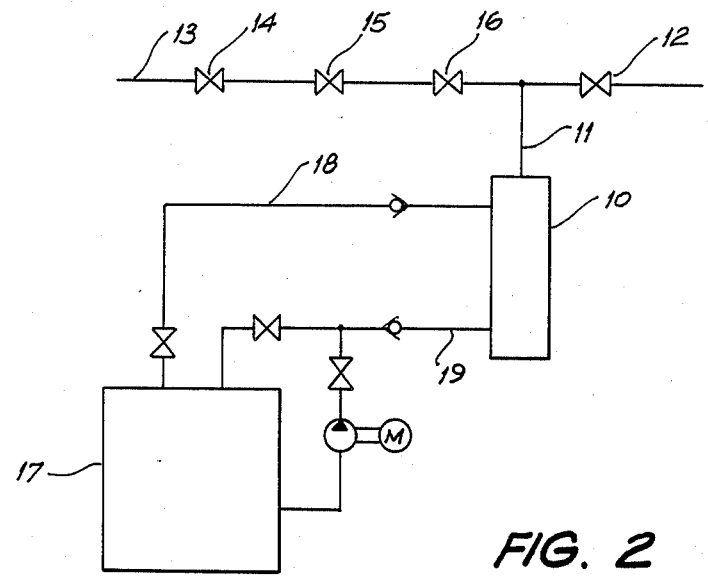

In order that the invention may be more readily understood and put into practical effect, reference will now be made to the accompanying drawings in which:

FIG. 1 shows the flux profile for an illustrative example of a gaseous back-wash system incorporating a partial permeate back-wash, and, FIG. 2 is a schematic diagram of a gaseous back-wash cleaning system according to one embodiment of the invention.

In FIG. 1, OA represents initial permeate flux, OC the filtering time and GH the recovered permeate flux. The length CF represents the time of permeate back-wash and FG the time of gas back-wash For a given set of operating conditions, the area ABCO depends on the rate of flux decline and length of time between successive back-wash operations. The area CDEF represents the volume of permeate back-wash.

In order to obtain optimal throughput, it is necessary to simultaneously:

(i) maximise area ABCO,
(ii) minimise area CDEF,
(iii) optimise permeate back-wash time CF,
(iv) optimise gas back-wash time FG,
(v) maximise recovered flux GH, and,
(vi) optimise permeate back-wash flux CD.

The gaseous back-wash can be implemented in a number of ways, and one such system is shown in FIG. 2. The filter 10 has a draw-off line 11 through which permeate normally flows to valve 12. Gas back-wash is introduced through line 13 which includes a gas pressure control valve 14, a gas flow valve 15 and a gas on/off valve 16. The filter 10 is connected to tank 17 through lines 18 and 19. The inclusion of valve 15, which controls gas flow, gives the line BD in FIG. 1 a sharp negative slope. The slower the gas flow, the shallower the (negative) slope of that line. If desired, the feed pressure may be dropped to zero before back-wash, in which case the line BD will bend at C, and BD will be vertical. This latter procedure is desirable where the gas breakthrough pressures are high, so that a lesser total pressure for the gas may be used since the liquid feed pressure does not have to be overcome.

The gas back-wash time should be sufficient to remove the fouling material from the membrane and from the body of the filter before re-application of normal process conditions. In other words, the volume of expanded gas should exceed the volume of the feed side of the hollow fibre filter, or the gaseous back-wash time should exceed the residence time for feed flowing through the filter.

Gaseous back-wash can be initiated automatically by using a timer, or a flowswitch on the permeate line.

The following examples illustrate the application of the invention and the methods used to give effect to the invention of gaseous back-wash cleaning of ultrafilters.

EXAMPLE 1

An ultrafilter of 0.16m$^2$ area was made according to Example 1 of our co-pending International patent application by depositing a "cross-linked polyamide" within the pores and as a network over the surface of a polypropylene ultrafilter. Within the context of this specification a "cross-linked polyamide" is one in which at least one of the group consisting of acid halides and primary and secondary amines is aromatic or substituted aromatic and the acid halide is normally used in excess to give chemical resistance and the average functionality is above two so that there is considerable cross-linking.

In Example 1 of our International patent application No. PCT/AU84/00179, terephthaloylchloride was used as the acid chloride and bis (3-aminopropyl) amine was used because of its solubility in hexane to provide a deposition formulation. The formulation was applied to the membrane and polyamide deposition was complete within an hour.

In order to ensure that the material deposited into the pores of the polypropylene a fine dilute emulsion was formed of size about 1 micron and of such interfacial tension with the continuous phase as to cause exclusion from the smaller pores but to allow entry into the coarser pores. The emulsion was formed as a hydrophobic mixture of:

Bis (3-aminopropyl) amine: 3.93 grams
P-tertiaryoctylphenoxy-polyethyleneglycolether: 0.1 grams
Petroleum spirit (b.p. 60°–80° C.): 950 milliliters
Absolute ethanol: 50 milliliters Water was added drop-by-drop until a distinct opalescent turbidity indicated that droplets above the wave length of visible light were present. These would, of course, be above 1 micron in size. Care was taken to apply the 1% weight per volume terephthaloylchloride solution in petroleum spirit as soon as the amine solution had evaporated to the desired film with droplets in the larger pores. The treated membrane was allowed to stand for 24 hours before fixing with the acid chloride to permit diffusion into the smaller pores as is required for thermodynamic stability.

The treated membrane was washed in a 20% weight per volume aqueous hydrochloric acid to dissolve any uncross-linked material and to hydrolyse the excess terminal acid chloride to carboxylic acid groups. A thorough water wash and drying at 60° C. completed the treatment.

The filter was tested for permeability at 75 kPa with the following results:

Tap water flux was 372 l/m$^2$hr.
Wheat starch factory waste flux
initial: 220 l/m$^2$hr.
after 30 min: 162 l/m$^2$hr.
after 45 min: 124 l/m$^2$hr.
after 16 hr: 36 l/m$^2$hr.

The seriously blocked ultrafilter was then back-washed with permeate at a pressure rising over 30 seconds to 300 kPa and retested on the starch waste at 75 kPa to give a flux of 151 l/m$^2$hr. A test showed unchanged complete rejection of 0.1% BP FEDARO M soluble cutting oil. The (slight) stretch due to the 200 kPa lumen pressure was elastically recovered.

Although this experiment did show that high pressure permeate back-wash was enhanced by the stretching of the fibres and that elastic recovery was possible, the loss of permeate was a detracting feature.

EXAMPLE 2

In another run on starch waste at 100 kPa, the above cartridge filter gave permeation rates after 24 hours of only 10 l/m$^2$hr. Back-washing through the lumen with permeate at 150 kPa and 200 kPa gave no increase in permeation rates. However at 400 kPa some slight swelling of the pores released particles which resulted in an initial permeation rate of 34 l/m$^2$hr on re-testing.

While the cleaning was still very incomplete there was evidence for a steeply increasing benefit as internal pressures rose to 400 kPa. The reason for this was believed to be the stretching of the fibres.

EXAMPLE 3

A larger composite cartridge (0.5m$^2$) having hollow fibres treated as set forth in Example 1 was fed with stiff starch waste and showed that permeate back-wash did not generate enough flow to clear the accumulation from the cartridge even at 700 kPa. At this latter pressure, much permeate was sacrificed in the 30 second flush back with liquid. On switching to air back-wash, no air appeared in five second trial pressures until 500 kPa, when a sudden cloud of fine bubbles rapidly turned to turbulent decompression. The rapidly expanding gas increased five fold in volume and swept out the shell side of the tubes cleanly. When the shell side was kept running at 200 kPa, there was a need, as expected, to raise the pressure to 700 kPa to achieve the same effect. The use of air back-wash possessed the further advantage of minimising permeate loss.

EXAMPLE 4

A composite cartridge of polypropylene made hydrophilic with cross-linked polyamide gave 75% rejection of gelatin. It was used on a rapid fouling industrial waste egg mucin. Initial rates at 100 kPa were 20 l/m$^2$hr and these fell off to 12 l/m$^2$hr in 20 minutes. A backblow with air at 500 kPa for five seconds returned rates to only 15 l/m$^2$hr. It was noted that stringy mucin was removed efficiently. It was found that a steadily rising back-wash for five seconds with a small quantity of permeate left in the line evidently cleared the microporous filling and that the following air pulse at 500 kPa peak blasted off the stringy mucin.

In this case the small volume of permeate in the permeate line (the minimum back-wash) steadily pressurised above the feed by 500 kPa, followed by three seconds of explosive gas expansion continually kept the rate at the initial 20 l/m$^2$hr, even when the feed was concentrated threefold.

EXAMPLE 5

A 50 L sample of brine of density 1.36 was obtained from a solar pond which had concentrated seawater over a period of three years to a saturated condition. The brine was contaminated by algae and other organic materials which were required to be removed for crystallisation. The sample was pumped into a cross-flow hollow polypropylene fibre filtration cartridge. The inlet pressure was 270 kPa. The concentrate backpressure was 200 kPa and the filtrate backpressure was 5 kPa. The initial flux was 106 L/hour from the cartridge. After 13 minutes this rate had fallen to 64 L/hour and continued to decline to 50 L/hour after a further 58 minutes. The unit was then back-washed with air at 500 kPa and the flux immediately returned to 106 L/hour. This cycle was repeated.

EXAMPLE 6

A 50 L sample of hydrolized wheat starch was filtered through a 50 micron screen and the fatty acids decanted. The resulting liquor was highly turbid with a very high suspended solids and dissolved solids loading. This material was pumped into a hollow polypropylene fibre cartridge at 200 kPa with a backpressure of 160 kPa and a filtrate backpressure of 5 kPa. The initial flux of 58 L/hour declined after 24 minutes to 31 L/hour. The cartridge was then back-washed with 500 kPa air and the flux immediately returned to 58 L/hour. Over a further period of 15 minutes the flux again declined to 31 L/hour. The cartridge was again back-washed and the cycle repeated. At all times the filtrate was a clear pale brown solution.

EXAMPLE 7

The 30 L sample of black water soluble ink waste from a packaging plant was pumped into a hollow polypropylene fibre cartridge at 200 kPa with a backpressure of 140 kPa and a filtrate backpressure of 5 kPa. The initial flux on commencement was 82 L/hour from the cartridge. After a period of 25 minutes this had declined to 60 L/hour. The cartridge was then back-washed with 500 kPa air and the flux returned to 82. The cycle was repeated. The filtrate at all times remained a clear pale orange colour.

EXAMPLE 8

A 50 L sample of polyvinyl acetate manufacturing waste was obtained. This waste included PVA polymer as well as other waste stream constituents. It had been treated by the addition of ferric chloride and the addition of caustic to adjust the pH to 10. The floc material was then pumped into a hollow polypropylene fibre filtration cartridge at 185 kPa with a backpressure of 145 kPa. The initial throughput rate was 53 L/hour. After 7 minutes it had declined to 43 and after 20 minutes it had declined to 36 L/hour. The unit was then back-washed with 500 kPa air for eight seconds and the flux immediately returned to 52 L/hour. The rate then continued to decline until back-wash was repeated.

EXAMPLE 9

A 25 L sample of unprocessed apple juice was processed through a hollow polypropylene fibre ultrafiltration unit. The inlet pressure was 70 kPa, the outlet pressure 65 kPa and the filtrate pressure 35 kPa. At the commencement of filtration the flux was 420 L/hour and after a period of two hours this declined slowly to 200 L/hour. On the application of a three second backwash with 500 kPa air, the flux returned to 420 L/hour. After a period of another hour the flux slowly declined to 200 L/hour and a three second back-wash again returned it to 420 L/hour. At all times the filtrate quality had a clarity greater than that considered to be the best available in the industry.

EXAMPLE 10

A 25 L sample of water which had been used for washing cut potatoes was collected for processing. The initial input pressure was 200 kPa, backpressure on the cartridge 150 kPa and filtrate pressure 20 kPa. When filtration commenced the flux was 132 L/hour from the hollow polypropylene fibre cartridge. After a period of 48 minutes, this flux declined to 90 L/hour. The cartridge was back-washed with 500 kPa air for five seconds and the flux returned to 120 L/hour. Over a period of another ten minutes the flux declined to 115 L/hour. The cartridge was then back-washed for five seconds and the flux was restored to 120 L/hour. The average potato starch content of the feed material was 8.6% and the average potato starch concentration in the filtrate was 0.13%.

EXAMPLE 11

A sample of wheat starch hyrolysate was obtained after it had been dosed with diatomaceous earth at the rate of 63 grams per 20 L. This material was pumped into hollow polypropylene fibre filtration cartridges at an inlet pressure of 185 kPa, an outlet backpressure of 95 kPa and a filtrate backpressure of 20 kPa. The initial throughput rate of flux was 19.2 L/hour and after a period of 16 minutes this declined to 14.1 L/hour. The cartridges then back-washed for 5 seconds with 475 kPa air and the flux was restored to 24.6 L/hour. The cartridge was then allowed to continue filtration for a further 12 minutes and the flux declined to 20.5 L/hour. Upon back-washing with air the flux was restored to 25.8 L/hour.

Various modifications may be made in details of the method of cleaning ultrafilters without departing from the scope and ambit of the invention.

I claim:

1. A method comprising cleaning a filter for filtering liquid suspension feedstocks, having a plurality of elastic, porous hollow fibers with lumens within a shell or housing in which filtration is carried out by applying a liquid suspension feedstock to the outer surface of the fibers by passing a portion of the feedstock through the walls of the fibers to be drawn from the fiber lumens as a filtrate or permeate, and by retaining a portion of the solids in the feedstock on or in the pores of the fibers, with the non-retained solids being removed from the shell or housing with the remainder of the feedstock, by introducing a pressurized gas at pressure of at least 10 KPA into the fiber lumens which passes through the walls of the fibers for a time sufficient to dislodge a substantial portion of the retained solids, the pressures being sufficient to overcome the effect of the surface tension of the continuous phase of the feedstock within at least the larger pores of the membrane.

2. The method according to claim 1, wherein the hollow fibers are formed from polymeric materials.

3. The method according to claim 1, wherein the hollow fibers have a hydrophilic coating.

4. The method according to claim 1, wherein the hollow fibers have a hydrophilic coating and a hydrophilic packing within the pores.

5. The method according to claim 1, wherein the gaseous cleaning step is preceded by a permeate back-wash step.

6. The method according to claim 1, wherein the gas is applied at a pressure in the range of 10–800 kPa.

7. The method according to claim 1, wherein the gas is applied at a pressure of 500 kPa.

8. The method according to claim 1, wherein the gas cleaning step is carried out for 1 to 5 seconds.

9. The method according to claim 1, wherein the volume of the gas introduced during the cleaning step is such that its expanded volume exceeds the volume of the feed side of the filter.

10. The method according to claim 1, wherein the duration of the gas cleaning step exceeds the residence time for feedstock flowing through the filter.

11. The method according to claim 1, wherein said pressurized gas is introduced into the fiber lumens for up to about eight seconds.

12. A method comprising operating a filter for filtering liquid suspensions feedstocks, having a plurality of elastic, microporous hollow fibers with lumens within a shell or housing by, (a) introducing a liquid suspension feedstock into the shell or housing and directing said feedstock to the outer surface of the fibers by passing a portion of the feedstock through the walls of the fibers to be drawn from the fiber lumens as a filtrate or permeate, and retaining a portion of the solids in the feedstock on or in the pores of the fibers, with the non-retained solids being discharged from the shell or housing with the remainder of the feedstock, and (b) periodically cleaning away the solids retained on or in the pores of the fibers by introducing a pressurized gas at pressures of at least 10 kPa into the fiber lumens which passes through the walls of the fibers for a time sufficient to dislodge a substantial portion of the retained solids, said pressure being sufficient to overcome the effect of the surface tension of the continuous phase of the feedstock within at least the larger pores of the membrane.

13. The method of operating a filter according to claim 12, wherein the hollow fibers are formed from polymeric material.

14. The method of operating a filter according to claim 12, wherein the hollow fibers have a hydrophilic coating.

15. The method of operating a filter according to claim 12, wherein the hollow fibers have a hydrophilic coating and a hydrophilic packing within the pores.

16. The method of operating a filter according to claim 12, wherein the gaseous cleaning step is preceded by a permeate back-wash step.

17. The method of operating a filter according to claim 12, wherein the gas is applied at a pressure in the range of 10–800 kPa.

18. The method of operating a filter according to claim 12, wherein the gas is applied at a pressure of 500 kPa.

19. The method of operating a filter according to claim 12, wherein the gas cleaning step is carried out for 1 to 5 seconds.

20. The method of operating a filter according to claim 12, wherein the volume of gas introduced during the cleaning step is such that its expanded volume exceeds the volume of the feed side of the filter.

21. The method of operating a filter according to claim 12, wherein the duration of the gas cleaning step exceeds the residence time for feedstock flowing through the filter.

22. The method according to claim 12, wherein said pressurized gas is introduced into the fiber lumens for up to about eight seconds.

23. A method comprising operating a filter for filtering liquid suspensions feedstocks, having a plurality of elastic, microporous hollow fibers with lumens within a shell or housing by (a) introducing a liquid suspension feedstock into the shell or housing and applying the feedstock to the outer surface of the fibers by passing a portion of the feedstock through the walls of the fibers to be drawn from the fiber lumens as a permeate, and retaining a portion of the solids in the feedstock on or in the pores of the fibers with the non-retained feedstock, by introducing of the feedstock, and (b) cleaning away the retained solids by applying through the fiber lumens a pressurized permeate back-wash which passes through the walls of the fibers to wash out at least a portion of the retained solids followed by a pressurized gas at pressure of at least 10 kPa which passes through the walls of the fibers for a time sufficient to stretch elastically at least a portion of the pores to dislodge a substantial portion of the solids retained in those pores and which washes the external walls of the fibers, said pressure being sufficient to overcome the resistance to gas flow of the surface tension of the continuous phase of the filtrate within at least the larger pores of the membrane.

24. The method according to claim 23, wherein said pressurized gas is introduced into the fiber lumens for up to about eight seconds.

* * * * *